US007226500B2

(12) United States Patent
Honma et al.

(10) Patent No.: US 7,226,500 B2
(45) Date of Patent: Jun. 5, 2007

(54) ADDITIVE FOR HEATING ASPHALT

(75) Inventors: Yuichi Honma, Wakayama (JP); Ryoichi Tamaki, Wakayama (JP); Takashi Mukai, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 10/501,506

(22) PCT Filed: Jan. 15, 2003

(86) PCT No.: PCT/JP03/00273

§ 371 (c)(1),
(2), (4) Date: Nov. 15, 2004

(87) PCT Pub. No.: WO03/060013

PCT Pub. Date: Jul. 24, 2003

(65) Prior Publication Data
US 2005/0066855 A1    Mar. 31, 2005

(30) Foreign Application Priority Data
Jan. 16, 2002  (JP)  ............... 2002-007457

(51) Int. Cl.
C09D 195/00 (2006.01)
C08L 95/00 (2006.01)
(52) U.S. Cl. ............... 106/273.1; 106/281.1; 106/316
(58) Field of Classification Search ............ 106/273.1, 106/281.1, 316
See application file for complete search history.

(56) References Cited

U.S. PATENT DOCUMENTS

| 2,461,416 | A | * | 2/1949 | Erdle et al. | 164/45 |
| 2,753,315 | A | * | 7/1956 | Miller | 524/59 |
| 3,305,509 | A | * | 2/1967 | Waterman et al. | 428/63 |
| 3,387,982 | A | * | 6/1968 | Rogers et al. | 106/281.1 |
| 3,493,409 | A | * | 2/1970 | Koons | 427/485 |
| 4,418,037 | A | * | 11/1983 | Katsuyama et al. | 422/56 |
| 5,928,418 | A | * | 7/1999 | Tamaki et al. | 106/277 |
| 6,376,455 | B1 | * | 4/2002 | Friedli et al. | 510/515 |
| 6,458,343 | B1 | * | 10/2002 | Zeman et al. | 424/63 |
| 2002/0045010 | A1 | * | 4/2002 | Rohrbaugh et al. | 427/372.2 |
| 2003/0069149 | A1 | * | 4/2003 | Adachi et al. | 510/155 |
| 2004/0170822 | A1 | * | 9/2004 | Rohrbaugh et al. | 428/323 |

FOREIGN PATENT DOCUMENTS

| EP | 0157210 A1 | 10/1985 |
| JP | 107230 C | 8/1934 |
| JP | 60-188462 A | 9/1985 |
| JP | 9-157530 A | 6/1997 |
| JP | 2001-002928 A | 1/2001 |
| JP | 2001-146706 A | 5/2001 |
| WO | WO 97/20891 A1 | 6/1997 |

OTHER PUBLICATIONS

Full English translation of JP-9-157530-A (publication date Jun. 17, 1997).

* cited by examiner

*Primary Examiner*—David M. Brunsman
(74) *Attorney, Agent, or Firm*—Birch, Stewart, Kolasch & Birch, LLP

(57) ABSTRACT

The invention provides an additive for heated asphalt that can further improve a peeling prevention effect between asphalt and aggregates. The invention relates to an additive which is added to heated asphalt containing a particular gallic acid ester with or combination of gallic acid and an alcohol.

14 Claims, No Drawings

ADDITIVE FOR HEATING ASPHALT

This application is a 371 national stage application of PCT/JP03/00273, filed Jan. 15, 2003, which claims priority of Japanese application No. 2002-7457, filed Jan. 16, 2002.

Field of the Invention

The present invention relates to an additive for heated asphalt used in paving roads and so on.

BACKGROUND OF THE INVENTION

Petroleum asphalt is used as a paving material, a roofing material, a waterproof material, and so on. Among these usages, demand for the paving material is the largest. In paving roads with heated asphalt, aggregates and asphalt are mixed and applied under heat. However, since nonpolar hydrophobic asphalt does not adhere sufficiently to hydrophilic aggregates, there is a potential problem in that asphalt peels from the aggregates through the interventional action of rainfall and ground water.

Thus, an improvement in the adhesiveness between the asphalt and the aggregates is a very important item for improving performance of the paved roads with heated asphalt; accordingly, many methods have been devised so far to improve the same.

For example, in JP-A No. 2001-2928, as a countermeasure for this, higher aliphatic polyalkylene polyamine and a salt of a modified polyolefin resin having a carboxyl group are used. However, although the adhesive property immediate after the addition to the heated asphalt can be improved, there is a problem in that the peeling prevention effect decreases after 4 to 7 days when preserved at a high temperature.

Furthermore, in JP-A No. 60-188462, it is described that a specific acidic organic phosphorous compound is effective in solving the problem mentioned above. However, though the adhesive property and the peeling effect are improved compared with other additives so far proposed, there is still room for improvement in the immediate result demanded in the market.

Recently there is a concern about the deterioration in qualities of asphalt and the aggregates. From the viewpoint of the effective utilization of resources, on the other hand, a recycling method of waste materials of pavement is proposed. However, in this case, as deteriorated asphalt is used, strong adhesion cannot be anticipated.

As just described, there is a tendency for increased demand for an improved asphalt for paving materials that uses the heated asphalt and the aggregates. However, a method that can solve the problems mentioned above and the performances demanded in market has not been developed yet.

Furthermore, in JP-A No. 9-157530, asphalt emulsion containing a gallic acid and/or gallic acid derivative is described. However, it is a technology relating to an asphalt emulsion system and has no relation with a system that uses heated asphalt containing no water.

SUMMARY OF THE INVENTION

The present invention relates to an additive for use in heated asphalt containing (I) and/or (II) below.

(I) Compounds represented by formula (1) below.

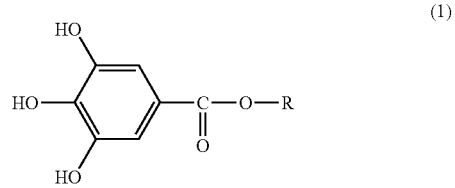

In the formula, R represents a hydrocarbon group having 1 to 22 carbon atoms.

(II) A compound represented by formula (2) and compounds represented by formula (3).

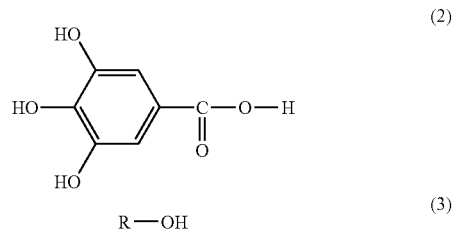

Furthermore, the invention relates to a heated asphalt composition in which an additive according to the invention is blended with asphalt heated at a temperature of 100 to 300° C.

Still furthermore, the invention relates to a heated asphalt composition containing the additive according to the invention and asphalt heated at a temperature of 100 to 300° C., the heated asphalt composition containing the additive in the range of 0.005 to 3% by weight relative to the asphalt.

Furthermore, the invention relates to a method of preventing asphalt from peeling, including adding the additive according to the invention to asphalt, wherein the additive contains no water.

Still furthermore, the invention relates to a method of preventing asphalt from peeling, including adding the additive according to the invention by 0.005 to 3% by weight to asphalt heated at a temperature of 100 to 300° C.

Furthermore, the invention relates to a method of manufacturing a heated asphalt composition, including adding the additive according to the invention by 0.005 to 3% by weight to asphalt heated at a temperature of 100 to 300° C.

Still furthermore, the invention relates to a heated asphalt composition that contains at least one compound selected from compounds (I) represented by formula (1) and compounds (II) represented by formulas (2) and (3), that is, compounds (I) and/or (II) and heated asphalt. The compounds (II) contain compounds according to formulas (2) and (3). Furthermore, the invention provides a method of preventing asphalt from peeling from aggregates, including adding the compounds to heated asphalt and then use of the compound as a heated asphalt additive.

DETAILED DESCRIPTION OF THE INVENTION

The compounds according to formula (1) that are used in an additive for use in heated asphalt of the invention each have an —OH group substituted in the benzene ring. In the invention, the compounds represented by formula (1) can be used separately or in combinations of two or more kinds.

Furthermore, each of the compounds represented by formula (2) and formula (3) can be used together from separately prepared ones.

The R in formula (1) or (3) represents a saturated or unsaturated and branched or straight chain hydrocarbon group having 1 to 22 carbon atoms, preferably having 5 to 20 carbon atoms, more preferably having 10 to 20 carbon atoms, and even more preferably having 10 to 18 carbon atoms. Alternatively, it may be a hydrocarbon group having 8 to 22 carbon atoms. Examples of such hydrocarbon groups include alkyl groups such as octyl, nonyl, decyl, undecyl, dodecyl, tridecyl, tetradecyl, pentadecyl, hexadecyl, heptadecyl, octadecyl, nonadecyl, eicosyl, stearyl, lauryl, myristyl, isoamyl and isopropyl; and alkyl phenyl groups such as octyl phenyl, nonyl phenyl, decyl phenyl, dodecyl phenyl, tridecyl phenyl and tetradecyl phenyl. The R is preferably an alkyl group having 1 to 22 carbon atoms or an alkenyl group having 2 to 22 carbon atoms, or an alkyl phenyl group having 7 to 22 carbon atoms. An alkyl group having 5 to 20 carbon atoms is preferable, and a straight chain alkyl group having 10 to 18 carbon atoms is more preferable.

There is no restriction on the method of manufacturing a compound represented by formula (1). However, a method of allowing reacting saturated or unsaturated, and branched or straight chain alcohol or alkylphenol having 1 to 22 carbon atoms with gallic acid contained in hydrolysable tannin material under the presence of a strong acid catalyst under a high temperature of 100° C. or more can be carried out. The examples of tannin material include condensed tannin such as nutgall, gall, smack, tare, valonia, chestnut, myrobalan, oak, Divi-Divi, and Algarobilla. The adequate examples of the strong acid include preferably sulfuric acid, hydrochloric acid or p-toluene sulfonic acid in the anhydrous form. Though it is possible to manufacture without using a strong acid catalyst, it takes a long reaction time in that case.

The reason why the asphalt additive according to the invention that contains the compound represented by formula (1) develops the adhesiveness and the peeling prevention effect immediately after the addition of the asphalt is not necessarily apparent. However, that the —OH group in the compound represented by formula (1) and the Si group on a surface of the aggregates generate a hydrogen bond is thought as the reason for this. Furthermore, since the compound represented by formula (1) is excellent in the mixability with the asphalt, it is thought that the bonding between the aggregates and asphalt becomes stronger. Still furthermore, when the compound represented by formula (2) and the compound represented by formula (3) are used together, it is considered that the compound represented by formula (2) reacts with the compound represented by formula (3) in the heated asphalt to form the compound represented by formula (1), and thereby an effect is exhibited.

In addition, when the compound represented by formula (2) and the compound represented by formula (3) are used together, a weight ratio of (2) to (3) is preferably 90/10 to 10/90, more preferably 70/30 to 30/70, and particularly preferably 60/40 to 40/60.

The additive according to the invention is blended with the asphalt preferably in the range of 0.01 to 3% by weight relative to the asphalt, more preferably in the range of 0.02 to 2% by weight, and still more preferably in the range of 0.05 to 1.5% by weight. When the addition amount is within this range, excellent adhesiveness between the asphalt and the aggregates as well as the peeling prevention effect can be exhibited.

There is no restriction on the method of adding the additive to the asphalt according to the invention; for example, a predetermined amount thereof has only to be added to asphalt heated and melted at 100 to 250° C. under agitation. Furthermore, since the additive according to the invention is excellent in the solubility and the affinity to the asphalt and thus can be blended evenly enough owing to thermal convection or vibration during transportation, there is no need of agitation; however, when immediate effect is demanded, blending is preferably carried out under agitation.

The heated asphalt additive according to the invention can be used together with various kinds of aliphatic amines. These are used to further improve the initial stage wettability of the asphalt to the aggregates owing to the presence of a nitrogen atom in a molecule. The examples of aliphatic amines include higher aliphatic polyamine typical in tallow propylene diamine and derivatives thereof, and alkylol amine such as alkylhydroxyamine, monoethanolamine, diethanolamine and triethanolamine.

The total content of the compound represented by formula (1) and/or the compound represented by formula (2) and the compound represented by formula (3) contained in the additive according to the invention is preferably in the range of 70 to 100% by weight, more preferably in the range of 80 to 100% by weight, and even more preferably in the range of 85 to 100% by weight.

In addition, in the additive according to the invention, a ratio of the total amount of the compound represented by formula (1) and/or the compound represented by formula (2) and the compound represented by formula (3) is preferably in the range of 0.005 to 3% by weight relative to the asphalt, more preferably 0.01 to 2% by weight, and even more preferably 0.03 to 1% by weight. Within this range, the peeling of the asphalt from the aggregates can be most effectively inhibited from occurring.

Furthermore, the additive according to the invention may include a slight amount of water in a range that does not deteriorate the effect of the invention. However, considering that the additive is blended with heated asphalt, the content of water is preferably 0.2% by weight or less, and more preferably 0.05% by weight or less. Particularly preferably, it is used in a state that does not contain water.

When the additive according to the invention is blended with asphalt heated at a temperature of 100 to 300° C., a heated asphalt composition can be prepared.

Examples of asphalt which may be used in the invention include asphalt manufactured by adding a softener to petroleum straight asphalt, semi-blown asphalt, cut-back asphalt, natural asphalt, petroleum tar, pitch or bituminous substance generated from solvent deasphalting so as to satisfy standards of asphalt for road pavement. Furthermore, reformed asphalt with increased consistency that is obtained by blending the asphalt with natural rubbers; synthetic rubbers such as styrene-butadiene copolymer and chloroprene polymer; thermoplastic elastomers; homopolymers of ethylene, vinyl acetate, acrylic ester, methacrylic ester and styrene or copolymers thereof may be used. These can be used heated at a temperature of 100 to 300° C., usually at a temperature of 160 to 250° C., and furthermore at a temperature 180 to 220° C.

To the heated asphalt composition according to the invention, in accordance with the respective objects, inorganic and organic fillers such as calcium carbonate, calcium hydroxide, cement and activated carbon, petroleum system softener such as petroleum resins and low molecular weight polyethylene, vegetable oil system softener such as oleic acid, various kinds of plasticizer and sulfur can be added.

The heated asphalt composition according to the invention can be used as a road paving material, a roofing material and a waterproof material. However, owing to the excellent peeling prevention performance, it is particularly preferable for use as a paving material among the applications.

The heated asphalt composition according to the invention can be preferably mixed with the aggregates. A blending ratio of the heated asphalt composition according to the invention to the aggregates is preferably 1 to 15% by weight to 99 to 85% by weight. As the aggregates, broken stones, sand, fillers and so on can be used.

The additive for heated asphalt according to the invention makes the adherence of the heated asphalt and the aggregates stronger. As a result, very excellent peeling prevention effect can be exhibited in the heated asphalt pavement.

EXAMPLE

According to a peel test of asphalt coating described in *ASUFARUTO HOSOU YOUKOU* (published by Japan Road Association), a test was carried out of the peelability between the asphalt and the aggregates according to a method shown below.

(Method of Peel Test)

One hundred grams of each of grains, having grain sizes that pass through a 13 mm mesh and are stopped by a 5 mm mesh, of aggregates (granite porphyry) from Takarazuka and aggregates (limestone) from Kuzuo are thoroughly washed, followed by drying in a 300 ml metal container. This is heated for an hour in a constant temperature drier that is kept at a temperature of 150° C. beforehand. On the other hand, after an asphalt composition is heated for a predetermined time period (2 hours or 48 hours) in a constant temperature drier kept at a temperature of 180° C., 5.5 g thereof is added to the aggregates. This is thoroughly agitated for 2 or 3 minutes with a scoop so that the asphalt may cover the surface of the broken stone completely. Subsequently, this is spread on a glass plate and left for 1 hour to cool to room temperature and to cure. The covered aggregates is immersed for 60 minutes in warm water in a constant temperature water bath kept at 80° C. and cooled after 30 minutes, followed by drying at room temperature. A state of the covered aggregates is visually observed from above, and an area percentage of peeled asphalt composition coating is obtained with reference to an area of asphalt composition coating at the time of test start. This is represented as the peeling rate.

EXAMPLE

A predetermined amount of a compound described in Table 1 was added to asphalt heated and melted at 180° C. followed by mixing at 180° C. for 1 to 3 minutes by use of a turbine-like stirring blade to be homogeneous, and thereby an asphalt composition was obtained. The obtained asphalt compositions were subjected to the peel test, and the results are shown in Table 1.

TABLE 1

| | | Additive to heated asphalt | Addition amount* (weight-%) | Peeled area (%) | | | |
|---|---|---|---|---|---|---|---|
| | | | | Granite porphyry | | Limestone | |
| | | | | 2 hours | 48 hours | 2 hours | 48 hours |
| Product of the invention | 1 | Lauryl alcohol/gallic acid ester | 0.2 | 0 | <5 | 0 | 0 |
| | 2 | Mirystyl alcohol/gallic acid ester | 0.2 | 0 | <5 | 0 | 0 |
| | 3 | Dodecanol/gallic acid ester | 0.2 | 0 | 5 | 0 | <5 |
| | 4 | Stearyl alcohol/gallic acid ester | 0.03 | 0 | 5 | 0 | <5 |
| | 5 | Stearyl alcohol/gallic acid ester | 0.3 | 0 | 0 | 0 | 0 |
| | 6 | Oleyl alcohol/gallic acid ester | 0.3 | <5 | 5 | <5 | <5 |
| | 7 | Cetyl alcohol/gallic acid ester | 0.2 | <5 | 5 | <5 | <5 |
| | 8 | Octyl alcohol/gallic acid ester | 0.2 | <10 | 10 | <10 | 10 |
| | 9 | Coconut oil alcohol/gallic acid ester | 0.2 | 0 | <5 | 0 | <5 |
| | 10 | Nonyl phenol/gallic acid ester | 0.2 | <5 | 5 | <5 | <5 |
| | 11 | Stearyl alcohol/gallic acid ester Triethylene tetramine | 0.2 0.05 | 0 | 5 | 0 | <5 |
| | 12 | Gallic acid Stearyl alcohol | 0.1 0.1 | 0 | 20 | 0 | 20 |
| | 13 | Stearyl alcohol/gallic acid ester | 0.01 | 10 | 20 | 10 | 20 |
| | 14 | Isoamyl alcohol/gallic acid ester | 0.2 | <5 | <5 | <5 | <5 |
| Comparative product | 1 | Nothing added | — | 60 | 80 | 40 | 70 |
| | 2 | Gallic acid | 0.5 | 60 | 80 | 35 | 70 |
| | 3 | Stearyl alcohol | 0.5 | 60 | 60 | 40 | 50 |
| | 4 | Phosphoric acid | 0.5 | 10 | 20 | 10 | 20 |
| | 5 | Stearyl phosphate ester | 0.1 | 20 | 60 | 20 | 30 |
| | 6 | Tallow alkyl propylene diamine | 0.5 | 10 | 30 | 10 | 20 |
| | 7 | Tallow alkyl propylene diamine Ethylene oxide three-mole adduct (average) | 0.5 | 20 | 60 | 10 | 50 |
| | 8 | Oleylaminoethyl imidazoline | 0.5 | 10 | 60 | 10 | 40 |
| | 9 | 1-aminoethyl-2-heptadecenylimidazoline-2 | 0.5 | 20 | 70 | 10 | 50 |
| | 10 | Oleilaminoethyl imidazoline | 0.2 | 20 | 70 | 20 | 60 |

*% by weight relative to asphalt

As is shown in Table 1, the asphalt composition containing the additive for heated asphalt according to the invention shows strong adhesiveness to the aggregates either of the acidic rock or the basic rock and does not lose its effect even under heating for a long period. Furthermore, even when the time period of blending with the asphalt is made much shorter, the adhesiveness and the peeling prevention effect are better than those of conventional ones, and thus it is apparent that an immediate effect is exhibited sufficiently.

In addition to the above, it is apparent that even when the addition amount of the inventive product is 0.01% by weight, the effect is the same as or more than that of the case where a comparative product is added by 0.5% by weight.

What is claimed is:

1. A heated asphalt composition that is formed by blending an additive with asphalt in the absence of water, said asphalt heated to a temperature of from 100 to 300° C., said additive comprising either one or both of (I) or (II) below:
(I) a compound represented by formula (1) below:

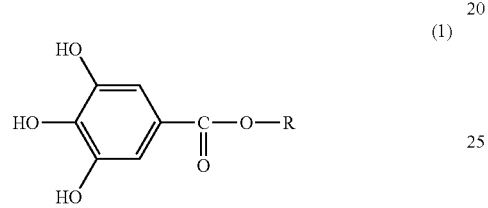

wherein R represents an alkyl group having 5 to 20 carbon atoms, an alkenyl group having 2 to 22 carbon atoms and an alkyl phenyl group having 7 to 22 carbon atoms; and (II) a compound represented by formula (2) and a compound represented by formula (3) below:

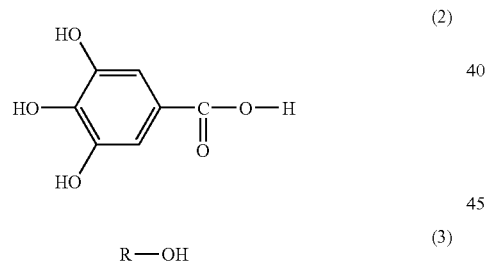

wherein R represents an alkyl group having 5 to 20 carbon atoms, an alkenyl group having 2 to 22 carbon atoms and an alkyl phenyl group having 7 to 22 carbon atoms.

2. The heated asphalt composition according to claim 1 wherein the additive is present in an amount of from 0.005 to 3% by weight relative to the asphalt.

3. The heated asphalt composition according to claim 1, wherein said additive comprises component (II).

4. The heated asphalt composition according to claim 1, wherein said additive comprises both component (I) and (II).

5. The heated asphalt composition according to claim 1, wherein said additive comprises component (I).

6. A heated asphalt composition comprising component (II) and optionally component (I), with component (I) represented by formula (1) and component (II) represented by formulas (2) and (3) and heated asphalt in the absence of water, wherein (I) and (II) are defined as follows:

(I) a compound represented by formula (1) below:

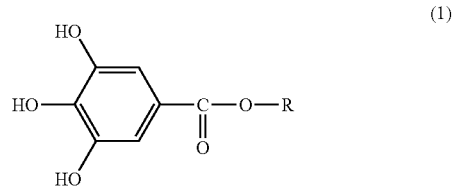

wherein R represents an alkyl group having 5 to 20 carbon atoms, an alkenyl group having 2 to 22 carbon atoms and an alkyl phenyl group having 7 to 22 carbon atoms; and (II) a compound represented by formula (2) and a compound represented by formula (3) below:

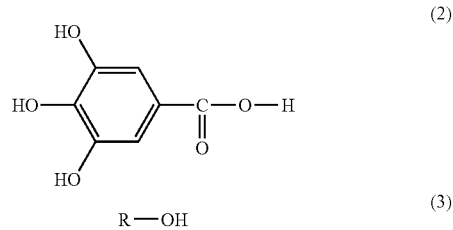

wherein R represents an alkyl group having 5 to 20 carbon atoms, an alkenyl group having 2 to 22 carbon atoms and an alkyl phenyl group having 7 to 22 carbon atoms.

7. A method of manufacturing an asphalt composition which is resistant to peeling, comprising combining an additive with asphalt in the absence of water, said additive comprising either one or both of (I) or (II) below:

(I) a compound represented by formula (1) below:

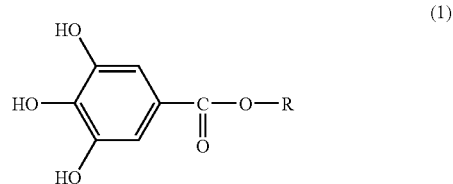

wherein R represents an alkyl group having 5 to 20 carbon atoms, an alkenyl group having 2 to 22 carbon atoms and an alkyl phenyl group having 7 to 22 carbon atoms; and (II) a compound represented by formula (2) and a compound represented by formula (3) below:

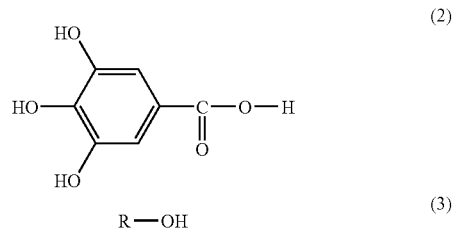

wherein R represents an alkyl group having 5 to 20 carbon atoms, an alkenyl group having 2 to 22 carbon atoms and an alkyl phenyl group having 7 to 22 carbon atoms.

8. A method of manufacturing an asphalt composition according to claim 7, comprising adding the additive to an asphalt which is heated to a temperature of from 100 to 300° C. in an amount of 0.005 to 3% by weight based on the weight of the asphalt.

9. The method of manufacturing according to claim 7, wherein said additive comprises component (I).

10. The method of manufacturing according to claim 7, wherein said additive comprises component (II).

11. The method of manufacturing according to claim 7, wherein said additive comprises both component (I) and (II).

12. A method of manufacturing an asphalt composition which is resistant to peeling, comprising combining an additive with asphalt in the absence of water, said asphalt heated to a temperature of from 100 to 300° C., said additive present in an amount of 0.005 to 3% by weight of the asphalt, said additive comprising either one or both of (I) or (II) below:

(I) a compound represented by formula (1) below:

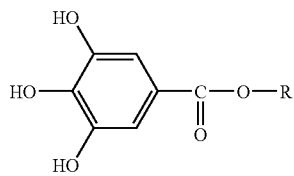

(1)

wherein R represents an alkyl group having 5 to 20 carbon atoms, an alkenyl group having 2 to 22 carbon atoms and an alkyl phenyl group having 7 to 22 carbon atoms; and (II) a compound represented by formula (2) and a compound represented by formula (3) below:

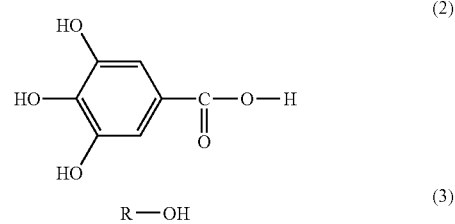

wherein R represents an alkyl group having 5 to 20 carbon atoms, an alkenyl group having 2 to 22 carbon atoms and an alkyl phenyl group having 7 to 22 carbon atoms.

13. The method of manufacturing according to claim 12, wherein said additive comprises component (I).

14. The method of manufacturing according to claim 12, wherein said additive comprises component (II).

* * * * *